US 008754745 B2

(12) United States Patent
Wang et al.

(10) Patent No.: US 8,754,745 B2
(45) Date of Patent: Jun. 17, 2014

(54) METHOD AND ELECTRONIC APPARATUS FOR CREATING BIOLOGICAL FEATURE DATA

(75) Inventors: John C. Wang, Taoyuan (TW); Fu-Chiang Chou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 868 days.

(21) Appl. No.: 12/902,387

(22) Filed: Oct. 12, 2010

(65) Prior Publication Data

US 2011/0084801 A1 Apr. 14, 2011

(30) Foreign Application Priority Data

Oct. 12, 2009 (TW) ................................ 98134526 A

(51) Int. Cl.
*G06F 21/32* (2013.01)
*G06F 21/83* (2013.01)

(52) U.S. Cl.
USPC .......................................................... 340/5.82

(58) Field of Classification Search
CPC ................................. G06F 21/32; G06F 21/83
USPC .................... 340/5.82, 5.83, 5.52, 5.53, 5.73; 382/124; 345/173
See application file for complete search history.

(56) References Cited

U.S. PATENT DOCUMENTS

| 5,229,746 A * | 7/1993 | Healy et al. .................... 340/459 |
| 5,838,306 A | 11/1998 | O'Connor et al. |
| 2002/0152078 A1 | 10/2002 | Yuschik et al. |
| 2003/0005336 A1 * | 1/2003 | Poo et al. ....................... 713/202 |
| 2007/0031011 A1 | 2/2007 | Erhart et al. |
| 2007/0150842 A1 * | 6/2007 | Chaudhri et al. ............. 715/863 |
| 2008/0209227 A1 | 8/2008 | Venkatesan et al. |
| 2009/0091544 A1 * | 4/2009 | Lindroos ........................ 345/173 |
| 2009/0140982 A1 | 6/2009 | Chen et al. |
| 2009/0160609 A1 | 6/2009 | Lin et al. |

FOREIGN PATENT DOCUMENTS

| CN | 1213398 C | 8/2005 |
| EP | 0593386 A2 | 9/1993 |
| TW | 200843445 | 11/2008 |
| WO | 03/050799 A1 | 6/2003 |
| WO | 2007/002029 A2 | 1/2007 |

OTHER PUBLICATIONS

European Search Report for European Patent Application No. 10013513.6, Jan. 7, 2011.
Office Action dated Feb. 10, 2011 from the Intellectual Property Office of P.R. China, citing CN1213398C.

\* cited by examiner

*Primary Examiner* — Edwin Holloway, III
(74) *Attorney, Agent, or Firm* — Kirton McConkie; Evan R. Witt

(57) ABSTRACT

A method is used for creating a biological feature data in an electronic apparatus with a user-operable controller. The method includes: capturing at least a biological feature of a user in response to a control signal generated by the controller due to a manipulating input operation of the user, thereby generating a biological feature data for user verification; and storing the biological feature data for user verification in the electronic apparatus while normally executing the control signal to perform a function corresponding to the manipulating input operation of the user.

19 Claims, 6 Drawing Sheets

METHOD AND ELECTRONIC APPARATUS FOR CREATING BIOLOGICAL FEATURE DATA

FIELD OF THE INVENTION

The present invention relates to a method and an electronic apparatus for creating a biologic feature data, and also relates to a recording medium stored therein a software program which is executed to implement a method for creating a biological feature data in an electronic apparatus with a user-operable controller.

BACKGROUND OF THE INVENTION

In consideration of information security, it is more and more common to impart a user-verifying function to an electronic device, and more particularly to a portable device such as USB drive, smart phone, laptop computer, personal digital assistant (PDA), etc. Generally, the user-verifying function is performed by way of biological feature check, e.g. fingerprint check.

Please refer to FIG. 1A, which schematically shows the appearance of a smart phone, and FIG. 1B, which illustrates the flowchart of a conventional fingerprint-verifying process applied to the smart phone. After a user switches on the power of the smart phone 1 (Step 101), a booting process is executed (Step 102), and then a prompt window pops up on the display 10 (Step 103), instructing the user to perform fingerprint check through a scanner 11 disposed on the phone (Step 104). After acquiring an image data corresponding to the user's fingerprint, the smart phone 1 compares it with a previously stored image data (Step 105). If a comparable result is obtained, the smart phone enters a normal operation mode (Step 106) so as to allow the user to normally operate the phone. Thus the user may input commands via an optical mouse 12 as shown in FIG. 1A or the display 10 when it is a touch screen. On the contrary, if the acquired image data does not conform to the previously stored image data, the smart phone enters a locked mode so that the input means is disabled from normal command input (Step 107).

It is understood from the above that a fingerprint image data is required to be previously stored for subsequent comparison. The method for creating fingerprint image data in a smart phone is usually complicated and unfriendly to a user.

Please refer to FIG. 2 which illustrates a flowchart of a conventional method for creating a fingerprint image data in a smart phone. After the smart phone is powered on (Step 200), a series of user's inputs through the optical mouse or touch screen by way of an operational menu are required (Step 201) before a fingerprint-creating step can be started with a popup window instructing creation of fingerprint (Step 202). For data creation, the smart phone enters a training mode. Under the training mode, the user's fingerprint image data is captured by the fingerprint scanner 11 (Step 203), and the captured image data is stored in the phone (Step 204) as the reference for subsequent user verification described above.

As described above, fingerprint data needs to be created and stored in advance using a fingerprint scanner so that subsequent verification can be performed. The training mode for acquiring the reference fingerprint data complicates the operation of the phone and thus confuses or bothers the user. Consequently, the fingerprint-verifying function is likely to leave unused, and the information security becomes risky.

SUMMARY OF THE INVENTION

Therefore, an object of the present invention is to simplify a user-identifying process of electronic apparatus in order to improve the utilization rate of a user-identifying function for information security of the electronic apparatus.

In an aspect, the present invention provides a method for creating a biological feature data in an electronic apparatus with a user-operable controller. The method comprises: capturing at least a biological feature of a user in response to a control signal generated by the controller due to a manipulating input operation of the user, thereby generating a biological feature data for user verification; and storing the biological feature data for user verification in the electronic apparatus while normally executing the control signal to perform a function corresponding to the manipulating input operation of the user.

In another aspect, the present invention provides an electronic apparatus, which comprises a controller capturing a biological feature of a user in response to a manipulating input operation of the user to generate a biological feature data for user verification, and a host coupled to the controller and storing the biological feature data for user verification in the electronic apparatus while normally performing a function corresponding to the manipulating input operation of the user.

In a further aspect, the present invention provides a recording medium stored therein a software program which is executed to implement the method for creating a biological feature data in an electronic apparatus with a user-operable controller, wherein the method comprises: capturing at least a biological feature of a user in response to a control signal generated by the controller due to a manipulating input operation of the user, thereby generating a biological feature data for user verification; and storing the biological feature data for user verification in the electronic apparatus while normally executing the control signal to perform a function corresponding to the manipulating input operation of the user.

In yet another aspect, the present invention provides an electronic apparatus, which comprises input means for capturing a biological feature of a user in response to a manipulating input operation of the user to generate a biological feature data for user verification; and control means for storing the biological feature data for user verification in the electronic apparatus while normally performing a function corresponding to the manipulating input operation of the user.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Nowadays, a variety of input control devices for electronic apparatus have been developed, and the input operations are generally manipulated by way of user's organs. For example, the input control devices may be hand-operated optical mice, finger-operated touch screens, eyeball motion sensors, voice control devices, etc. Then the associated biological features can be used for user verification.

Figure 1A:
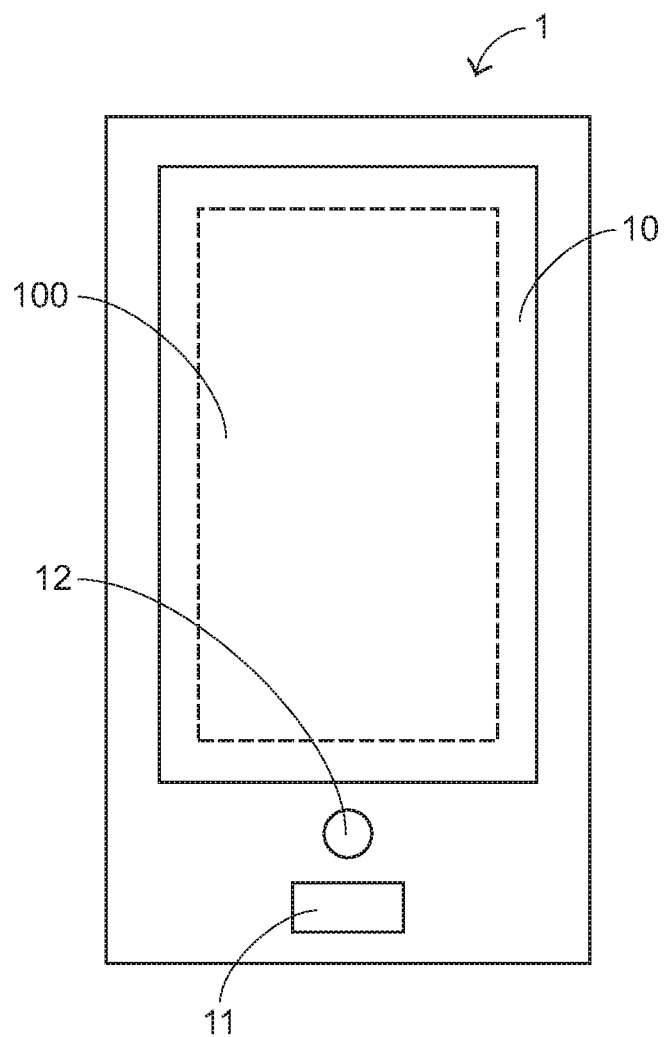
FIG. 1A is a schematic diagram showing the appearance of a smart phone.
Figure 1B:
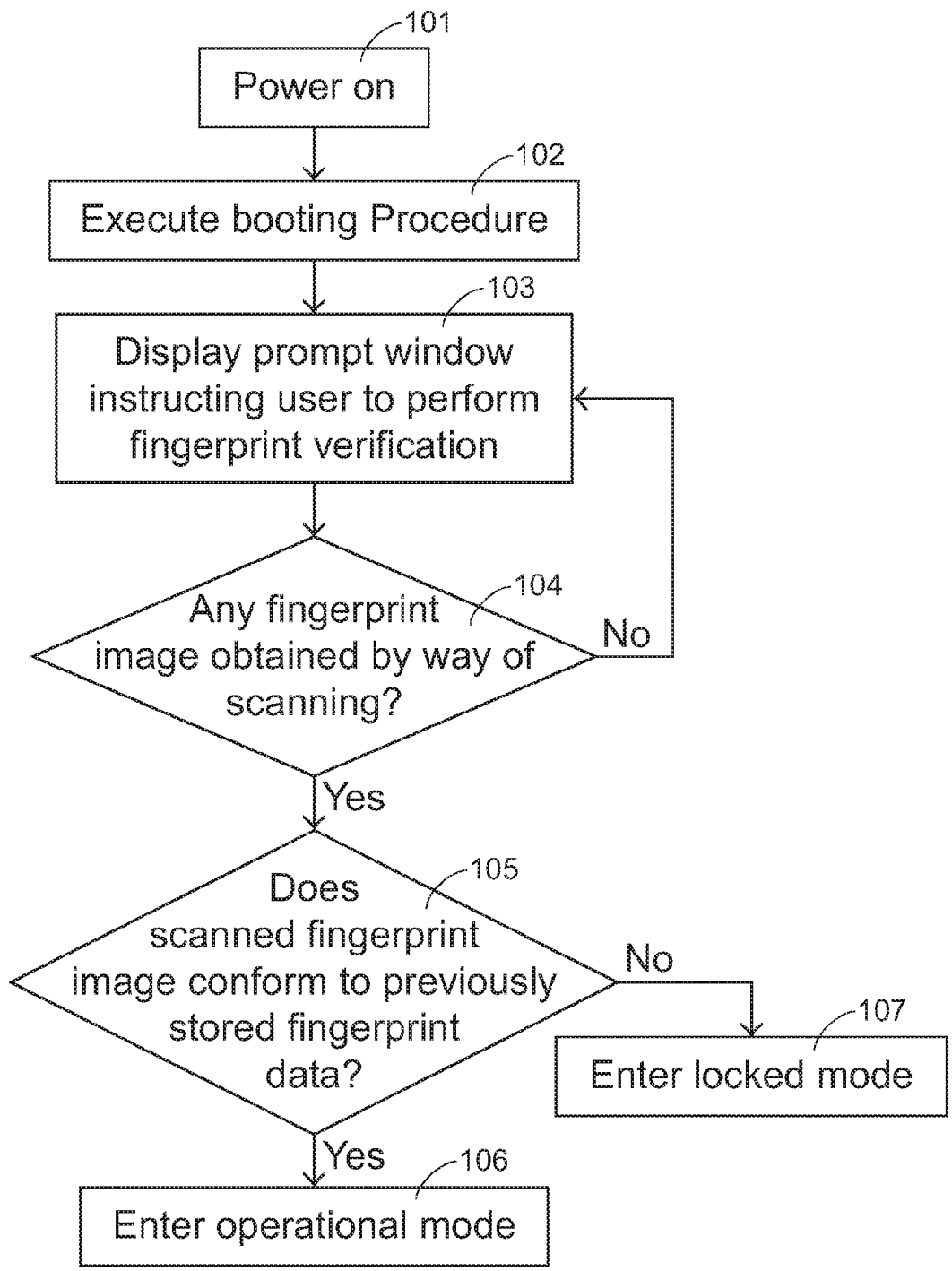
FIG. 1B is a flowchart illustrating a conventional fingerprint-verifying process applied to the smart phone of FIG. 1A.
Figure 2:
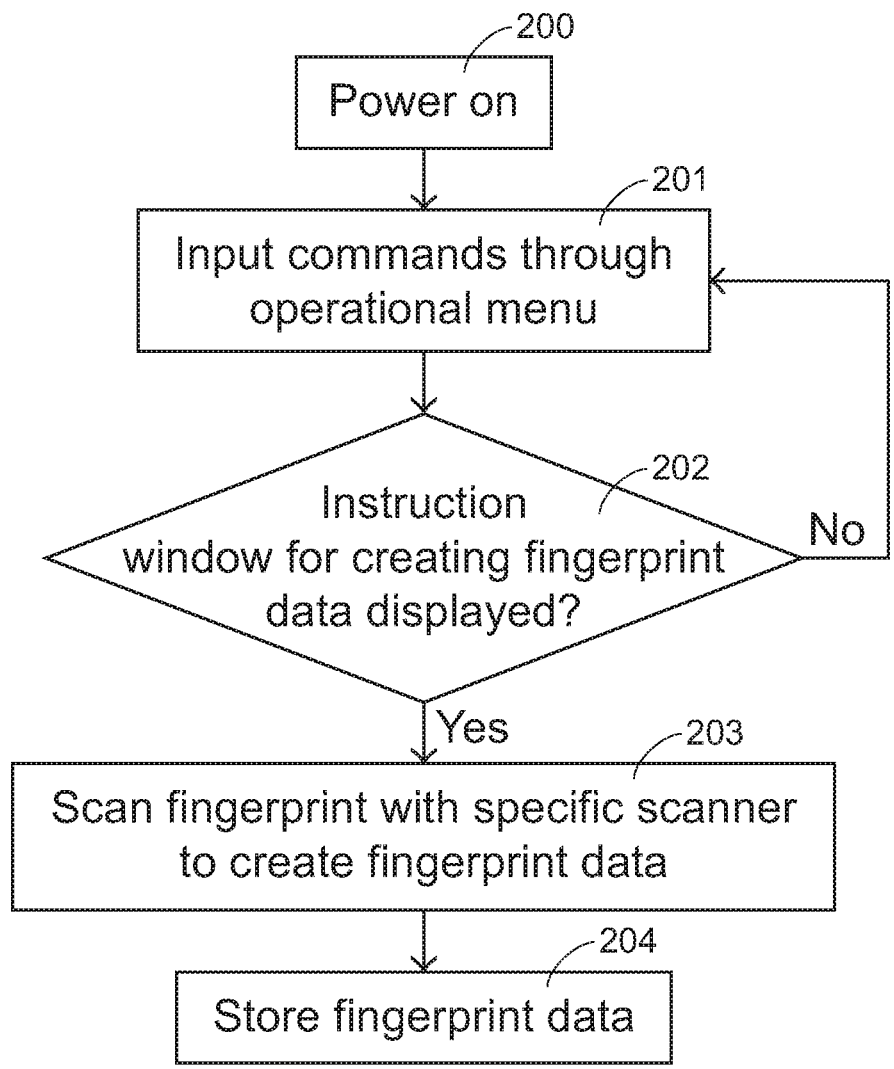
FIG. 2 is a flowchart illustrating a conventional method for creating a fingerprint image data in a smart phone.
Figure 3:
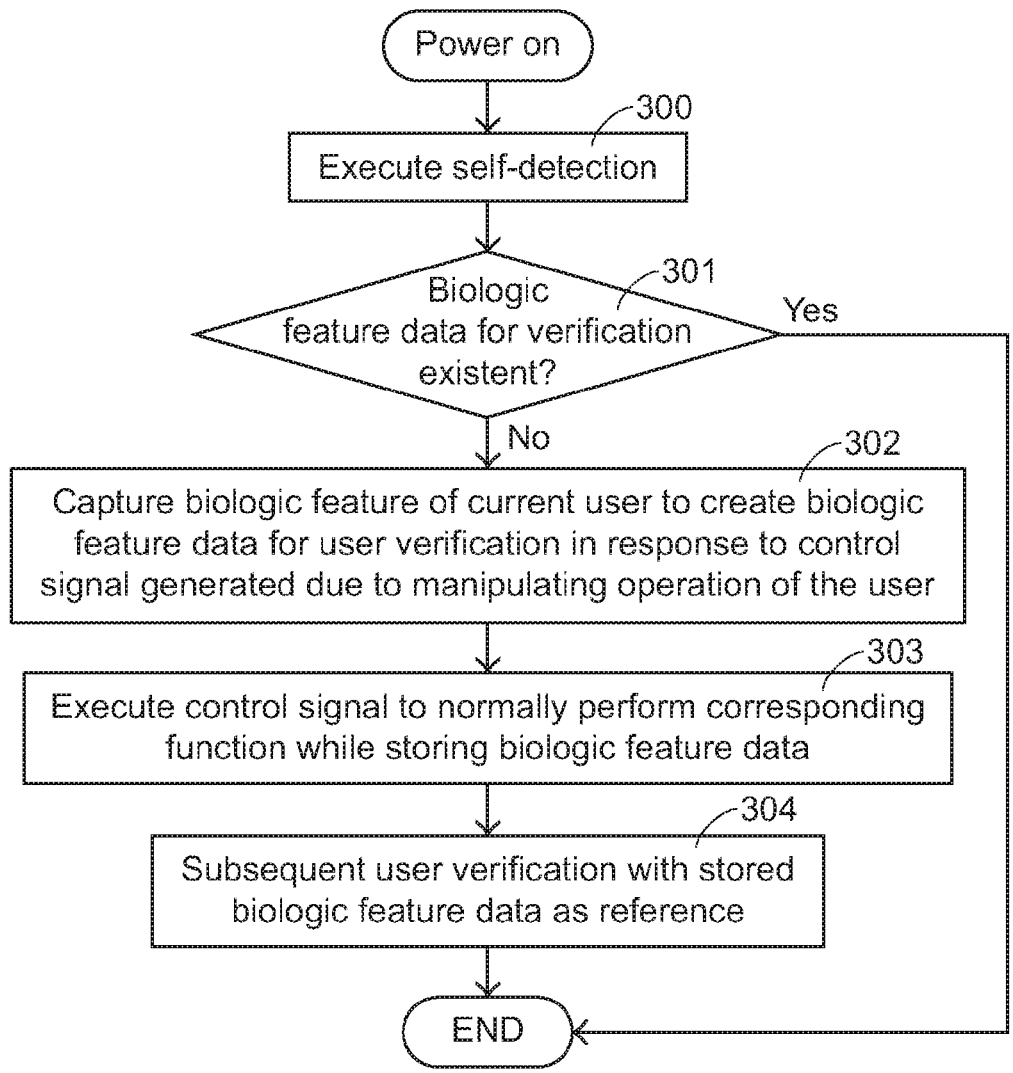
FIG. 3 is a flowchart illustrating a method for creating a biological feature data according to an embodiment of the present invention.
Figure 4:
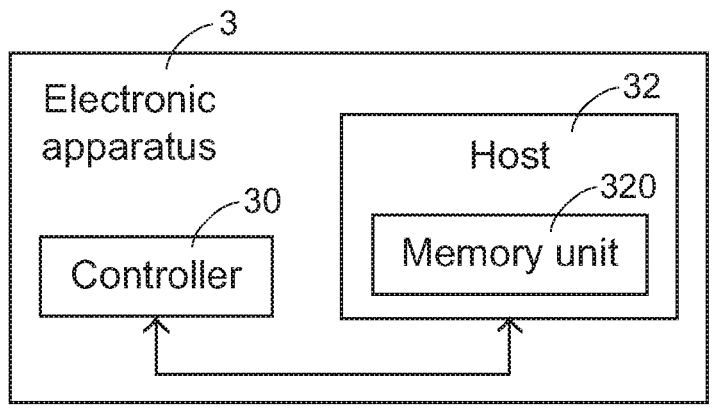
FIG. 4 is a functional block diagram illustrating an electronic apparatus with a biological-feature-verifying function according to an embodiment of the present invention.

Please refer to FIG. 3 which illustrates a flowchart of a method for creating biological feature data in electronic apparatus according to an embodiment of the present invention. After the electronic apparatus is powered on (Step 300), self-detection is performed to determine whether any biological feature data for user verification is existent or not (Step 301). If there is no biological feature data for user verification existent, a training mode for capturing a specific biological feature of the user is automatically entered without instructing the user to do anything for the capturing operation with any prompt or dialogue window. In the training mode, the specific biological feature of the user is captured in response to a control signal generated due to a manipulating operation of the user on the electronic apparatus for attempting to execute a function, which is not necessarily a biological feature capturing function, and accordingly, a biological feature data for user verification is created (Step 302). Then the electronic apparatus executes the function corresponding to the control signal while storing the biological feature data for subsequent user verification (Step 303). After the biological feature data is created and stored, subsequent user verification can be performed (Step 304).

For executing the self-detection and creation of biological feature data for user verification mentioned above, the electronic apparatus comprises a controller 30 for generating the control signal so as to capture the biological feature when receiving the manipulating input from the user. The captured biological feature data is then sent to a host 32 coupled to the controller 30 as well as the manipulating input. Then the biological feature data is stored in a memory unit 320 of the host 32 and the function corresponding to the manipulating input is executed by the host 32.

Take a smart phone as an example of the electronic apparatus. After the smart phone is powered on and if the self-detection indicates no pre-stored biological feature data available, then the training mode is automatically entered without informing the user. In other words, viewing from the user's end, a normal input operation is being performed. In response to the user's input operation through for example a built-in optical mouse or touch screen, the controller 30 generates the control signal so that the user verification described above is performed. In this way, no additional operation for capturing the biological feature is required, and the creation of the biological feature data can be accomplished silently.

The automatic capturing of biological feature according to the present invention may be used in a variety of electronic apparatus. Non-limiting examples comprises computers, laptop computers, mobile phones, smart phones, PDAs, PDA phones, multimedia players, game devices, navigators, Car PC, etc. A controller 30 adapted to be used in the electronic apparatus for generating the control signal may be but is not limited to an optical mouse, a touch screen, a camera module, or a voice-control module. The biological feature to be captured may be but is not limited to fingerprint, palm print, iris, or voiceprint. The biological feature capture function may be but is not limited to a fingerprint image capture function, a palm print image capture function, an iris image capture function, or a voiceprint capture function. The user's manipulating input resulting in the generation of the control signal may be any operation conducted by the user's biological organ with the biological feature to be captured, wherein the biological organ with the biological feature may be but is not limited to fingers, palms, eyeballs, or voice. The host 32 executing the function corresponding to the manipulating input may be but is not limited to a microprocessor or a digital signal processor.

Means for capturing fingerprint as the biological feature with an optical mouse built in a mobile phone is exemplified herein. As known to those skilled in the art, while the user is moving his finger relative to the optical mouse, a change on the pattern of the scanned fingerprint is referred to for determining the movement direction and speed of a cursor or an object. The pattern scanned at one time, however, is generally a part of the fingerprint due to the limitation of the mouse size. For creating a referable biological feature data, it may be necessary to move the finger over the optical mouse a plurality of times and properly combine the resulting image into a full pattern of fingerprint. Any conventional or new technique making the combination of the scanned fingerprint patterns feasible may be used with the present invention to create the biological feature data, and thus is not particularly specified and described herein.

Another example of the means for capturing fingerprint as the biological feature for use with a mobile phone is a touch screen. By integrating an image-sensing element with an display, the fingerprint-capturing operation may be performed while the user is touching the display for command input with his finger. Any conventional or new technique making the integration of the image-sensing element with the display feasible may be used with the present application to create the biological feature data, and thus is not particularly specified and described herein.

In a further example, an eyeball sensor is used with the electronic apparatus to generate the control signal for capturing the user's biological feature while the user is manipulating a camera module with his eyes. The eyeball sensor detects the rotation of the user's eyeball so as to control cursor movement or screen scrolling. Meanwhile, the unique iris pattern of the user is captured and stored as the biological feature data for user verification.

In addition to fingerprint and iris patterns mentioned above, other biological features such as palm prints, palm contour, face contour, and vein patterns are also usable for user verification. Alternatively, a unique voice feature may be used as the biological feature for user verification, and a voice control module may be used to pick up the user's voiceprint.

No matter what the biological feature data is, the data size is preferably but not necessarily reduced by way of screening feature values. The user-verifying speed can be enhanced accordingly.

Figure 5:
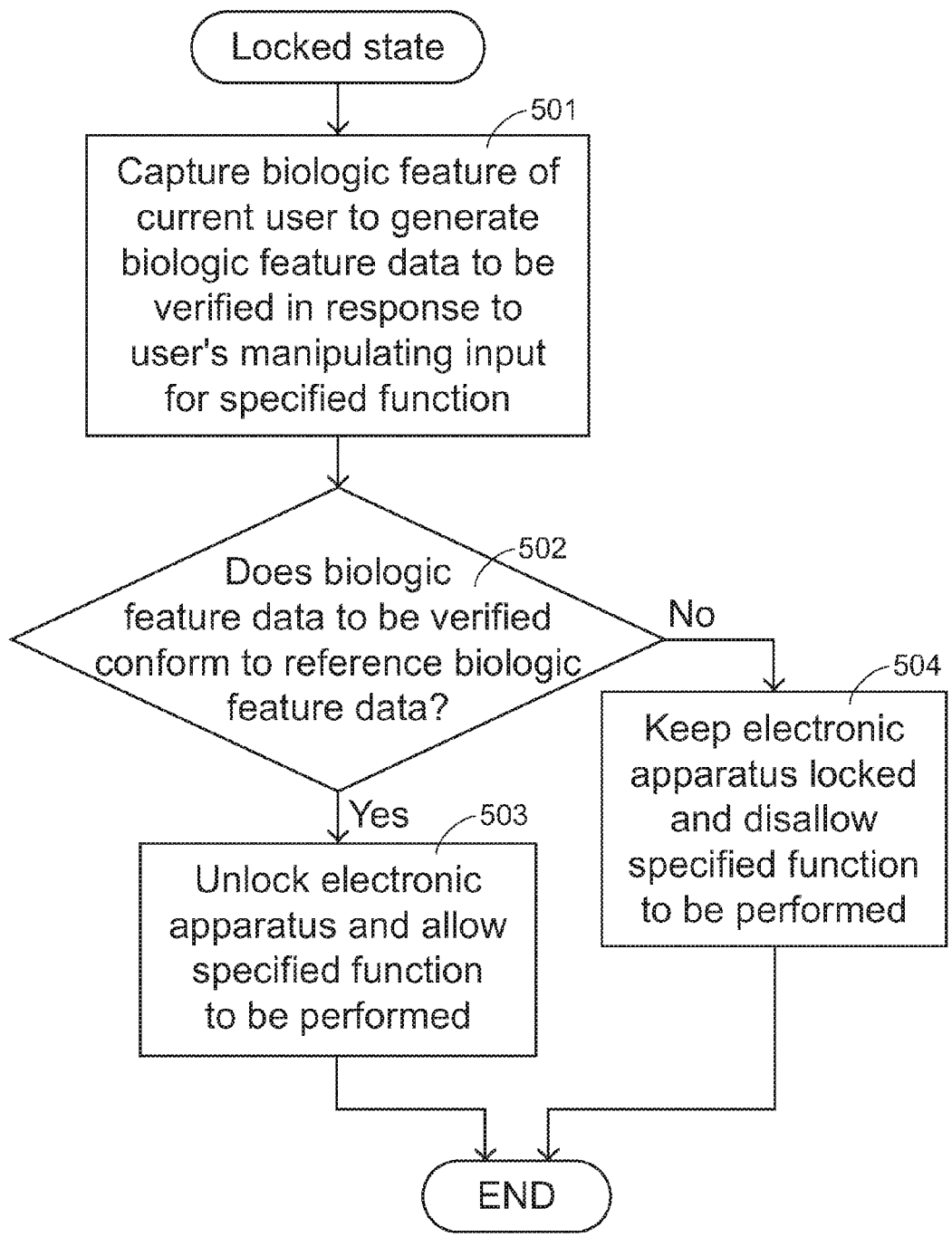
FIG. 5 is a flowchart illustrating operations of an electronic apparatus with a biological-feature-verifying function according to an embodiment of the present invention.

As described in the step 304, subsequent user verification may be performed after the biological feature data is created and stored. In an embodiment illustrated in the flowchart of FIG. 5, the electronic apparatus is preset to be locked until a user passes the verification. When the electronic apparatus receives a manipulating input for a function from an arbitrary user, a biological feature of the user is captured at the same time and a biological feature data to be verified is generated (Step 501). The biological feature data to be verified is compared with the stored reference biological feature data for user verification to determine the conformity (Step 502). If the biological feature data to be verified conforms to the biological feature data for user verification, the electronic apparatus is unlocked so that the function in response to the manipulating input can be performed (Step 503). On the other hand, if the biological feature data to be verified does not conform to the biological feature data for user verification, the electronic apparatus keeps locked from executing the function (Step 504). By way of user verification, the information of the electronic apparatus can be secured.

Figure 6:
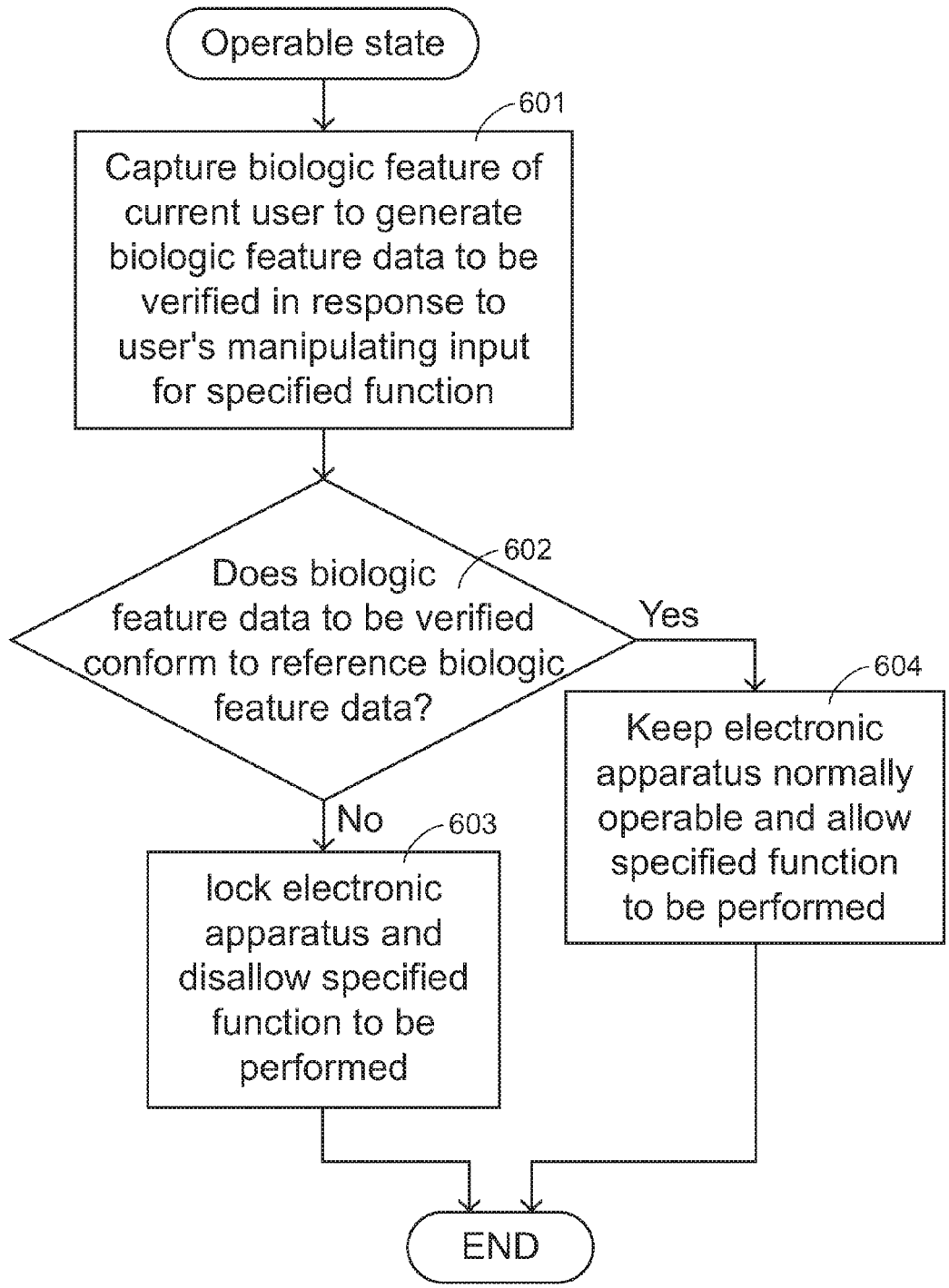
FIG. 6 is a flowchart illustrating operations of an electronic apparatus with a biological-feature-verifying function according to another embodiment of the present invention.

In another embodiment illustrated in the flowchart of FIG. 6, the electronic apparatus is preset to be normally operable until an unauthorized user is detected. When the electronic apparatus receives a manipulating input for a function from an arbitrary user, a biological feature of the user is captured at the same time and a biological feature data to be verified is generated (Step 601). The biological feature data to be verified is compared with the stored biological feature data for user verification to determine the conformity (Step 602). If the biological feature data fails in the user verification, i.e. the biological feature data to be verified does not conform to the stored biological feature data for user verification, the electronic apparatus is locked from executing the function (Step 603). On the other hand, if the biological feature data passes the user verification, i.e. the biological feature data to be verified conforms to the biological feature data for user verification, the function in response to the manipulating input is performed automatically (Step 604). The information of the electronic apparatus can also be secured in this way.

Whether the biological feature data to be verified conforms to the biological feature data for user verification or not may be determined according to a variety of criteria. For example, for avoiding erroneous discrimination, the user verification procedure may be repeated more than once to reconfirm the failure in user verification. In other words, it is determined that the biological feature data to be verified does not conform to the biological feature data for user verification when the biological feature data to be verified and the biological feature data for user verification are not comparable in a predetermined number of consecutive sampling cycles, e.g. five consecutive cycles.

For implementing the biological-feature-data creation and subsequent user verification, a software program is written into a recording medium, e.g. a hardware-accessible medium, an optical disc, a memory card, a USB drive, etc., as digital data, and executed by the electronic apparatus.

To sum up, the method for creating a biological feature data for user verification may be applied to electronic apparatus, for example an information-processing device such as a computer, a laptop computer, a mobile phone, a smart phone, a PDA, a PDA phone, a multimedia player, a game device, a navigator, or a Car PC, and executed through a controller. While an owner of the information-processing device is using the device through the controller at the very first time, e.g. touching the sensing screen, manipulating the optical mouse, or watching the camera module, a biological feature image is created and stored in the device. The capturing operation of the biological feature image may necessarily be repetitively performed to acquire enough information. The repeated capturing operations, however, are automatically performed without instructing the user. In addition to image, the biological feature data to be created and stored may also be voice data. Afterwards, whenever an arbitrary user is using the information-processing device, the previously stored biological feature data may be used as a reference for verification. According to the state of the information-processing device and the discriminating result indicating whether the user is the owner, the information-processing device enters a proper mode for subsequent operations.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for creating a biological feature data in an electronic apparatus with a user-operable controller, the method comprising:
   automatically capturing at least a biological feature of a user without instructing the user to do anything for the capturing operation in response to a control signal generated by the controller due to a manipulating input operation of the user, thereby generating a biological feature data for user verification; and
   storing the biological feature data for user verification in the electronic apparatus while normally executing the control signal to perform a function corresponding to the manipulating input operation of the user.

2. The method according to claim 1, further comprising:
   entering into a locked state;
   capturing a biological feature of a current user in response to a manipulating input operation of the current user for performing a function, thereby generating a biological feature data to be verified;
   comparing the biological feature data to be verified with the biological feature data for user verification; and
   unlocking the electronic apparatus and allowing the electronic apparatus to perform the function corresponding to the manipulating input operation of the current user if the biological feature data to be verified conforms to the biological feature data for user verification.

3. The method according to claim 2, further comprising:
   keeping the electronic apparatus locked and disallows the electronic apparatus to perform the function corresponding to the manipulating input operation of the current user if the biological feature data to be verified does not conform to the biological feature data for user verification.

4. The method according to claim 3, wherein it is determined that the biological feature data to be verified does not conform to the biological feature data for user verification when the biological feature data to be verified and the biological feature data for user verification are not comparable in a predetermined number of consecutive sampling cycles.

5. The method according to claim 1, further comprising:
   entering into an operable state;
   capturing a biological feature of a current user in response to a manipulating input operation of the current user for performing a function, thereby generating a biological feature data to be verified;
   comparing the biological feature data to be verified with the biological feature data for user verification; and locking the electronic apparatus and disallowing the electronic apparatus to perform the function corresponding to the manipulating input operation of the current user if the biological feature data to be verified does not conform to the biological feature data for user verification; or keeping the electronic apparatus normally operable and allows the electronic apparatus to perform the function corresponding to the manipulating input operation of the current user if the biological feature data to be verified conforms to the biological feature data for user verification.

6. The method according to claim 1 wherein the manipulating input operation is a hand operation on an optical mouse, a finger operation on a touch screen, an eyeball motion detected by an eyeball motion sensor, or a voice detected by a voice control device.

7. The method according to claim 1 wherein the biological feature data for user verification comprises a fingerprint image data for user verification when the controller is an optical mouse, and is created by moving a finger of the user over the optical mouse a plurality of times and combining the resulting image data into the fingerprint image data.

8. The method according to claim 1 wherein capturing the biological feature of the user comprises:
  capturing a plurality of biological feature parts of the user in response to multiple manipulating input operations of the user, respectively; and
    generating the biological feature data for user verification according to the plurality of biological feature parts.

9. A non-transitory recording medium stored therein a software program which is executed by a user-operable controller and a host to implement a method for creating a biological feature data in an electronic apparatus with the user-operable controller and the host, wherein the method comprises:
  automatically capturing at least a biological feature of a user without instructing the user to do anything for the capturing operation in response to a control signal generated by the user-operable controller due to a manipulating input operation of the user, thereby generating a biological feature data for user verification; and
  storing the biological feature data by the host for user verification in the electronic apparatus while normally executing the control signal to perform a function corresponding to the manipulating input operation of the user.

10. An electronic apparatus, comprising:
  a controller automatically capturing a biological feature of a user without instructing the user to do anything for the capturing operation in response to a manipulating input operation of the user to generate a biological feature data for user verification; and
  a host coupled to the controller and storing the biological feature data for user verification in the electronic apparatus while normally performing a function corresponding to the manipulating input operation of the user.

11. The electronic apparatus according to claim 10, wherein when the electronic apparatus enters a locked state, the controller captures a biological feature of a current user in response to a manipulating input operation of the current user for performing a function, thereby generating a biological feature data to be verified, the electronic apparatus compares the biological feature data to be verified with the biological feature data for user verification, and the electronic apparatus is unlocked and performs the function corresponding to the manipulating input operation of the current user if the biological feature data to be verified conforms to the biological feature data for user verification.

12. The electronic apparatus according to claim 11, wherein the electronic apparatus is kept locked and disallows the electronic apparatus to perform the function corresponding to the manipulating input operation of the current user if the biological feature data to be verified does not conform to the biological feature data for user verification.

13. The electronic apparatus according to claim 11, wherein it is determined that the biological feature data to be verified does not conform to the biological feature data for user verification when the biological feature data to be verified and the biological feature data for user verification are not comparable in a predetermined number of consecutive sampling cycles.

14. The electronic apparatus according to claim 11, wherein when the electronic apparatus enters an operable state, the controller captures a biological feature of a current user in response to a manipulating input operation of the current user for performing a function, thereby generating a biological feature data to be verified, the electronic apparatus compares the biological feature data to be verified with the biological feature data for user verification, and the electronic apparatus is locked and disallows the function corresponding to the manipulating input operation of the current user to be performed if the biological feature data to be verified does not conform to the biological feature data for user verification.

15. The electronic apparatus according to claim 14, wherein the electronic apparatus is kept normally operable and performs the specified function corresponding to the manipulating input operation of the current user if the biologic feature data to be verified conforms to the biologic feature data for user verification.

16. The electronic apparatus according to claim 11, wherein the manipulating input operation is a hand operation on an optical mouse, a finger operation on a touch screen, an eyeball motion detected by an eyeball motion sensor, or a voice detected by a voice control device.

17. The electronic apparatus according to claim 11, wherein the biological feature data for user verification comprises a fingerprint image data for user verification when the controller is an optical mouse, and is created by moving a finger of the user over the optical mouse a plurality of times and combining the resulting image data into the fingerprint image data.

18. The electronic apparatus according to claim 11, wherein the controller captures a plurality of biological features of the user in response to multiple manipulating input operations of the user, respectively, and generates the biological feature data for user verification according to the plurality of biological features.

19. An electronic apparatus, comprising:
  an input device for automatically capturing a biological feature of a user without instructing the user to do anything for the capturing operation in response to a manipulating input operation of the user to generate a biological feature data for user verification; and
  a control device coupled to the input device for storing the biological feature data for user verification in the electronic apparatus while normally performing a function corresponding to the manipulating input operation of the user.

* * * * *